United States Patent [19]

Kovarik

[11] 3,864,142
[45] Feb. 4, 1975

[54] METAL OXIDE SOLS
[75] Inventor: James F. Kovarik, Berwyn, Ill.
[73] Assignee: Nalco Chemical Company, Chicago, Ill.
[22] Filed: Jan. 12, 1973
[21] Appl. No.: 323,006

Related U.S. Application Data
[63] Continuation-in-part of Ser. No. 137,670, April 26, 1971.

[52] U.S. Cl............................ 117/100 S, 252/313 S
[51] Int. Cl............................................. B01j 13/00
[58] Field of Search ............... 252/313 S; 117/100 S

[56] References Cited
UNITED STATES PATENTS

| | | | |
|---|---|---|---|
| 2,892,797 | 6/1959 | Alexander et al. | 252/313 S |
| 3,139,406 | 6/1964 | Mindick et al. | 252/313 S |
| 3,252,917 | 5/1966 | Mindick et al. | 252/313 S |
| 3,691,089 | 9/1972 | Janzon et al. | 252/313 S |

OTHER PUBLICATIONS

Merck & Co., The Merck Index, 1952 p. 41.
Julius Grant, Hackh's Chemical Dictionary, Third Ed., McGraw-Hill, p. 39.
Weast and Selby, CRC Handbook of Chemistry and Physics, Forty-Eighth Edition, page B-149.

*Primary Examiner*—Norman G. Torchin
*Assistant Examiner*—Alfonso T. Suro Pico
*Attorney, Agent, or Firm*—John G. Premo; James F. Lambe; John S. Roberts, Jr.

[57] ABSTRACT

A simple process for preparing metallic oxide coated silica sols and pure metallic oxide sols involves dispersing a metallic chloride and the sol, treating with an anion exchange resin, and recovering the product.

5 Claims, No Drawings

METAL OXIDE SOLS

This is a continuation-in-part of application Ser. No. 137,670 filed Apr. 26, 1971.

Hydrous metal oxide sols are disclosed in Australian Pat. No. 292,414, which is incorporated herein by reference. This patent teaches a method of preparing metallic oxide coated sols wherein the coating thickness is greater than 1.0 monolayers. This method involves a series of ion exchange and heating steps to form the final product. This method is time consuming and oftentimes a coating thickness of greater than 1.0 monolayers is not desired. The concept of a thickness being a fraction of a monolayer is well-known to the art and is described in Alexander et al., U.S. Pat. No. 2,892,797. In column 4, lines 58-63 it states that the products of that invention are silica sols with particles which are coated with less than a molecular layer of a combined metal.

The instant invention teaches a short, simple method for producing metallic oxide coated sols having a coating thickness of from 0.10 to 1.0 monolayers. It has been found that by the elimination of the heating steps and the second ion exchange step taught in the aforementioned Australian Patent, such a sol can be prepared.

INTRODUCTION

If it were possible to produce metal oxide coated sols by simple manufacturing technique, whereby the finished sol was relatively concentrated, non-viscous, and stable a valuable contribution in the art would be afforded. If available, such sols would have many uses in such diversified industrial applications as adsorbents for purifying various types of mixed hydrocarbon liquids and gases. They could be utilized as compact or porous carriers substances having properties similar to such well known materials as active alumina and silica gel. The sols would be of particular interest in the preparation of catalysts useful in such petroleum refinery operations as cracking, desulfurization, polymerization, hydrogenation, isomerization, and the like. The products would also find further usefulness in the treatment of metal objects such as sheet metal, whereby the steel could be made nonreceptive to metal coatings, i.e., galvanizing, or tin plating. Still another industrial application of improved hydrous metal oxide sols would be their use in improving the coefficient of friction between metal surfaces that tend to move one with respect to the other. A further field of usefulness for commercially practical hydrous metal oxide sols would be in the preparation of non-skid paper containers, i.e., cartons or multi-wall Kraft bags, as well as the treatment of floor waxes to render them slip resistant.

Still another useful area of application for hydrous metal oxide sols having the improved characteristics described would be for employment in the treating of both porous and non-porous surfaces to render them less susceptible to soiling.

OBJECTS

It, therefore, becomes an object of this invention to provide improved metal oxide sols and metal oxide coated sols, particularly aluminum, iron, chromium and titanium coated sols. These sols should be readily procured, have high purity and have physical and chemical characteristics which have not, heretofore, been available or known.

A further object of the invention is to furnish metal oxide coated silica sols which, due to their unique properties and characteristics, have a wide range of applications in many industrial processes.

Other objects will appear hereinafter.

THE INVENTION

In accordance with the invention, it has been found that metal oxide coated sols and metal oxide sols having new, improved, as well as interesting chemical and physical characteristics may be prepared by treating silica sols with metallic chloride and then subsequently treated with a strong base anion exchange resin in a particular salt form which removes the chlorides from the system. The pure metallic oxide sols can be prepared by using the metallic chloride without the silica sol.

The compositions of the invention comprise a metal oxide coated silica sol consisting of a hydrophilic liquid having dispersed, therein, particles of colloidal silica which are uniformly coated. The amount of the metallic chloride used is sufficient to form a coating of from 0.10 to about 1.0 monolayers. In other words, the silica particles are uniformly coated with the metal oxide up to a monolayer but as low as one-tenth of a monolayer. Preferably, the coating ranges from 0.125 to 0.50 monolayers. The amount of the metallic chloride needed to thus coat the silica particles varies dependent on the size of the silica sol particles, the specific metallic chloride, and the concentration of the silica sol.

This invention also contemplates the preparation of pure metallic oxide sols. Titanium oxide, iron oxide, aluminum oxide and chromium oxide sols can be prepared by the subject matter of this disclosure. The method of preparing pure metallic oxide sols comprise dispersing a metallic chloride in water; treating the water containing dispersed metallic chloride with an anion exchange resin; and recovering the metallic oxide sol as the product.

Prior art methods prepared coated silica sols having an excess of a monolayer of coating. This was not only uneconomical but unnecessary. It has now been discovered that very useful coated silica sols can be prepared using a monolayer of metallic oxide or less. These sols have unique properties and have a minimum of coating.

One of the surprising features of the hydrous metal oxide sols of the invention is that the total solids concentration of the finished products is high as compared to conventional prior art hydrous metal oxide sols. By using the methods of this invention, it is possible to produce hydrous metal oxide sols having a total solids concentration of at least 5 percent by weight, but the concentration being capable of variation within the range of between 5 to 40 percent by weight. Very stable and useful products having a total solids content within the range of 15 to 30 percent by weight are usually produced.

In addition to having a relatively high total solids content, the finished hydrous metal oxide sol, in the case of aluminum sols, will have a pH range of from between 1.0 to 6.5, with a preferred pH range being within the range of between 3.0 and 5.5. This latter pH range is extremely desirable for stable and useful alumina coated silica sols. In the case of the ferric oxide coated silica sols the pH of the finished sol will preferably be between 2.0 and 3.5. The pH of the finished chromic oxide coated silica sols will preferably be between 3.0 and 4.5.

A further important characteristic of the hydrous metal oxide sols is their freedom from electrolytes and other ionic components. They may be said to be salt-free. The finished sols will in all instances have conductivities ranging from 400 to 6,000 micromhos. In the case of aluminium sols, the preferred conductivity usually will not exceed 3,000, and preferably ranges from 400 to 2,600. The preferred sols of the invention, those having a total solids content of between 15 and 30 percent by weight, are relatively non-viscous liquids, which may be handled without the need of using special mixing equipment or agitational devices to render them fluid, as in the case of the conventional thixotropic sols of the prior art.

Typical starting aqueous colloidal silica sols that may be used either as furnished or after deionization are those silica sols set forth below in TABLE I. Preferably, Nalcoag 1034A is used for the practice of this invention.

as forming a suitable dilution for the starting silica sol. It is surprising to find that the acidic salts may be dissolved therein without gelation or precipitation of the silica occurring. This is an important manufacturing advantage provided by the invention, since special handling precautions need not be observed and only simple mixing equipment to handle the mixed solution need be used.

The volatile weak inorganic acid, or more specifically, the anion thereof, that is preferably used is the bicarbonate. The sulfide, cyanide and nitrite can also be used. Of course, due to the inherent disadvantages in using the acids or salts containing the sulfide or cyanide radical, these are less desirable for most practical purposes. The water-soluble alkali metal bicarbonates are admirably suited for treating strongly basic anion exchange resins to place the resin in a form appropriate for subsequent treatment with a dilute solution of the appropriate metal halide. Excellent results have been achieved by using solutions of sodium bicarbonate. Although the water-soluble alkali metal salts of these par-

TABLE I

| NALCOAG | 1030 | 1034A | 1035 | 1050 | 1060 | 1130 | 1140 |
|---|---|---|---|---|---|---|---|
| % Colloidal Silica, as $SiO_2$ | 30% | 34% | 35% | 50% | 50% | 30% | 40% |
| pH | 10.2 | 3.1 | 8.6 | 9.0 | 8.5 | 10.0 | 10.0 |
| Ave.Particle Size, millimicrons | 11–16 | 16–22 | 16–22 | 17–25 | 40–60 | 8 | 15 |
| Ave.Surface Area, $M^2$/gram | 190–270 | 135–190 | 135–190 | 120–176 | 50–75 | 375 | 200 |
| Specific Gravity at 68°F. | 1.205 | 1.230 | 1.255 | 1.385 | 1.390 | 1.214 | 1.296 |
| Viscosity at 77°F. cps | <5 | <5 | 5 | 70 | 5–10 | 7 | 8 |
| % $Na_2O$ | 0.4% | <0.01% | 0.10% | 0.30% | 0.10% | 0.65% | 0.40% |

It is preferred that the silica concentration of the sol be adjusted to provide an $SiO_2$ concentration between 4 to 20 percent by weight, although concentrations within the range of 2 to 35 percent by weight may also be employed. Only deionized silica sols are used in the practice of this invention. Some of the compounds that are used for the coating are aluminum chloride, ferric chloride, chromium chloride, titanium tetrachloride, and titanium trichloride.

The metal oxide coated sols are prepared by adding the metallic chloride solution to the hydrophilic colloidal dispersed silica to form a solution or reaction product and then treating the solution with a water insoluble anion exchange resin which has as its exchangeable anion, an anion of a weak volatile inorganic acid. The treatment of the solution with the resin is continued until the pH of the solution has risen by not more than 2.0 and preferably not more than 1.5 pH units and the specific conductance has dropped to not less than 400 micromhos. At this point the resin is removed from the system either by filtration, decantation, or the like. The quantity of acidic salt used to form the solution should be of sufficient quantity to produce the metal oxide coated sols of this invention.

The acidic metal salt may be added to the silica sol either as a solid or as a solution with the solvent being the same type as used to suspend the colloidal silica, which is generally water. When concentrated colloidal aqueous silica sols are used, it is possible to add the acidic metal salts dissolved in distilled or deionized water directly to the colloidal silica sols. This provides both a simple means for adding the acidic salt as well ticular classes of anions are preferably used, it is apparent that other methods may be used to regenerate the resins prior to their employment in the practice of the invention.

It would seem from the above that many of the weak volatile inorganic acids do not exist in their free acid form. Thus, for example, bicarbonate acid does not exist as such, although it may be considered as the weak acid salt of an anion exchanger which has been placed in this form by treatment with the corresponding monovalent water-soluble metallic salts thereof.

To illustrate the preparation of several hydrous metal oxide salts using the general preparative techniques described above, the following examples are presented. In each example the term "resin" is used to designate the ion exchange resin sold as "Nalcite SAR," in its bicarbonate form. Wherever conductance values are given they indicate specific conductance and are expressed in terms of numerical values only. The conductance values in each instance indicate micromhos/centimeter at 77°F.

Although there are many methods in the prior art of making coated silica sols, the invention in this method of making coated silica sols is simplicity itself. The metallic chloride is merely mixed with the silica sol without heat. A resin, preferably Nalcite SAR in the bicarbonate form, is then contacted with the sol and subsequently separated. The resin is separated; the product is recovered. There is no need for a multi-step resin treatment or the addition of heat. The silica particles have been found to be coated with the appropriate metal used based upon the fact that when they are mixed with uncoated silica sols, a gel results indicating a different charge and subsequent gelation.

steps were identical except for the fact that naturally no silica sol was added.

TABLE II

| Sx. No. | % Solids | g. Silica Sol | g. $H_2O$ | Metal Oxide $M_2O_3$ | Ratio $M_2O_3/SiO_2$ | Coating Compound | g. Coating Compound | g. Resin | Conductivity | pH | % Monolayer |
|---|---|---|---|---|---|---|---|---|---|---|---|
| 1 | 20 | 295 | 186 | $Al_2O_3$ | 0.09 | $Al_2(OH)_5Cl$ | 38.3 | 50 | 2,600 | 5.0 | 1.0 |
| 2 | 20 | 295 | 195 | $Al_2O_3$ | 0.045 | $Al_2(OH)_5Cl$ | 19.15 | 50 | 465 | 6.4 | 0.5 |
| 3 | 30 | 441 | 52 | $Al_2O_3$ | 0.022 | $Al_2(OH)_5Cl$ | 14.0 | 30 | 1,160 | 465 | 0.25 |
| 4 | 20 | 295 | 200 | $Al_2O_3$ | 0.025 | $Al_2(OH)_5Cl$ | 9.6 | 20 | 500 | 5.3 | 0.25 |
| 5 | 30 | 441 | 45 | $Cr_2O_3$ | 0.066 | $CrCl_3·6H_2O$ | 35.23 | 300 | 3,500 | 4.0 | 0.5 |
| 6 | 30 | 441 | 52 | $Cr_2O_3$ | 0.033 | $CrCl_3·6H_2O$ | 17.6 | 150 | 2,000 | — | 0.25 |
| 7 | 30 | 441 | 55.5 | $Cr_2O_3$ | 0.165 | $CrCl_3·6H_2O$ | 8.8 | 50 | 2,900 | — | 0.125 |
| 8 | 30 | 441 | 68 | $Cr_2O_3$ | | $CrCl_3·6H_2O$ | 8.8 | 100 | 1,320 | 4.3 | 0.125 |
| 9 | 30 | 2205 | 340 | $Cr_2O_3$ | | $CrCl_3·6H_2O$ | 44.0 | 400 | 2,050 | 3.45 | 0.125 |
| 10 | 30 | 441 | 129 | $Cr_2O_3$ | 0.133 | $CrCl_3·6H_2O$ | 70.46 | 300 | 3,650 | 3.85 | 1.0 |
| 11 | 30 | 441 | 40 | $Fe_2O_3$ | 0.035 | $FeCl_3·6H_2O$ | 17.7 | 100 | 1,040 | 3.25 | 0.25 |
| 12 | 20 | 885 | 615 | $Fe_2O_3$ | 0.14 | $FeCl_3·6H_2O$ | 142.0 | 900 | 3,400 | 2.0 | 1.0 |
| 13 | 10.2 | — | 1400 | — | — | $CrCl_3·6H_2O$ | 491.0 | 3000 | 6,150 | 4.2 | Pure $Cr_2O_3$ |
| 14 | 7.3 | — | 2000 | — | — | $FeCl_3·6H_2O$ | 500.0 | 4200 | 3,550 | 2.8 | Pure $Fe_2O_3$ |
| 15 | 9.18 | — | 400 | — | — | $Al_2(OH)_5Cl$ | 1000.0 | 80 | 8,750 | 5.1 | Pure $Al_2O_3$ |
| 16 | 20 | 238 | 205 | $TiO_2$ | 0.07 | $TiCl_4$ | 10 ml | 200 | 15,000 | 1.1 | 1.0 |
| 17 | 20 | 238 | 147 | $Ti_2O_3$ | 0.07 | $TiCl_3$ | 72.5* | 200 | 7,000 | — | 1.0 |

*20% Solution

To prepare the aluminum coated sol, $Al_2(OH)_5Cl·XH_2O$ is used. To make the titanium dioxide coated sol, titanium tetrachloride is used. To make the iron coated sol, $FeCl_3·6 H_2O$ is used; and to make the chromium sol, $CrCl_3·6 H_2O$ is used.

A preferred source of basic aluminum halide is the aluminum chlorhydroxy complex described in U.S. Pat. Nos. 2,571,030 and 2,876,163. These aluminum chlorhydroxy complexes have a general empirical formula $(Al_2(OH)_5Cl)_x$, where $x$ is a lower integer ranging from 1 to 5. Of these the most preferred materials are those in which there is one-sixth or less equivalents of chloride per each equivalent of aluminum.

Following are examples of the preparation of the metallic oxide coated silica sols and pure metallic oxide sols.

EXAMPLE I 57.45 grams of chlorohydrol [$Al_2(OH)_5Cl$] were diluted with 30.3 grams of water. To this was added 441 grams of Nalcoag 1034A. To this was added with mixing 66 grams of Nalcite SAR resin in the bicarbonate form. After the reaction was complete, the resin was filtered off to recover the product. The final pH was 4.9 and the conductance 2100 micromhos. The silica concentration was 30 percent, with a monolayer of $Al_2O_3$. The $Al_2O_3/SiO_2$ ratio was 0.09.

EXAMPLE II

The same procedure was followed as in Example I except using the following quantities:
28 grams of $Al_2(OH)_5Cl$
45 grams of water
441 grams of Nalcoag 1034A
50 grams of resin The final product had a pH of 4.95 and a conductance of 1,280. The silica concentration was 30 percent with a 0.5 layer of $Al_2O_3$. The $Al_2O_3/SiO_2$ ratio was 0.045.

The following table was prepared to show various preparations of the coated silica sols and the pure metal oxide sols of this invention. In all cases, the silica sol used as a starting material was Nalcoag 1034A.

The samples were prepared the same way as Example I. When a pure metallic oxide sol was prepared, the

SUMMARY

This invention provides an easy method of preparing metallic oxide coated silica sols and pure metallic oxide sols. Prior art methods prepared coated silica sols having an excess of a monolayer of coating. This was not only uneconomical but unnecessary. It has now been discovered that very useful coated silica sols can be prepared using a monolayer of metallic oxide or less. These sols have unique properties and have a minimum of coating.

The coated metallic oxides have unique properties and a wide number of uses. The coatings comprise from 0.10 to 1.0 monolayers and compare favorably to prior art coated silica sols which contain an excess of a monolayer of coating. Prior art methods taught that in order to produce useful coated silica sols an excess of the metallic compound was needed. This invention teaches the exact opposite. Useful sols are prepared using a monolayer or less of the metallic oxide coating.

I claim:

1. A process of preparing metallic oxide coated silica sols which comprise the steps of:
   A. adding a metallic chloride to a silica sol having from 5 to 40 percent by weight $SiO_2$ to form a reaction product, with the amount of the metallic chloride being sufficient to coat from 0.10 to 1.0 of a monolayer of metal oxide which corresponds to the metal of the metallic chloride on the surface of said silica sol;
   B. treating the reaction product with an anion exchange resin; and
   C. recovering the reaction product as the metallic oxide coated silica sol product, said steps being the only steps used in said process.

2. The process of claim 1 wherein the metallic chloride is selected from the group consisting of aluminum chloride, ferric chloride, chromium chloride, titanium tetrachloride, and titanium trichloride.

3. The process of claim 1 wherein the anion exchange resin is in the bicarbonate form.

4. The process of claim 1 wherein the reaction product is treated with an anion exchange resin until the pH has risen two units.

5. The process of claim 1 wherein the metallic oxide coated silica sol product contains from 5 to 40 percent by weight solids.

* * * * *